United States Patent
Kenmochi (10) Patent No.: US 10,002,572 B2
(45) Date of Patent: Jun. 19, 2018

(54) LIQUID CRYSTAL MONITOR DEVICE, DISPLAY SYSTEM, AND BACKLIGHT CONTROL METHOD

(75) Inventor: Isamu Kenmochi, Tokyo (JP)

(73) Assignee: NEC DISPLAY SOLUTIONS, LTD., Tokyo (JP)

(*) Notice: Subject to any disclaimer, the term of this patent is extended or adjusted under 35 U.S.C. 154(b) by 12 days.

(21) Appl. No.: 14/125,563

(22) PCT Filed: Jun. 14, 2011

(86) PCT No.: PCT/JP2011/063566
§ 371 (c)(1),
(2), (4) Date: Dec. 11, 2013

(87) PCT Pub. No.: WO2012/172637
PCT Pub. Date: Dec. 20, 2012

(65) Prior Publication Data
US 2014/0104323 A1    Apr. 17, 2014

(51) Int. Cl.
G09G 3/34   (2006.01)
G09G 3/36   (2006.01)
G06F 3/14   (2006.01)

(52) U.S. Cl.
CPC ......... *G09G 3/3406* (2013.01); *G06F 3/1423* (2013.01); *G09G 3/36* (2013.01);
(Continued)

(58) Field of Classification Search
None
See application file for complete search history.

(56) References Cited

U.S. PATENT DOCUMENTS

| | | | |
|---|---|---|---|
| 2007/0159410 A1* | 7/2007 | Yamamoto et al. | 345/1.1 |
| 2010/0117927 A1* | 5/2010 | Amagami et al. | 345/1.1 |
| 2011/0095965 A1* | 4/2011 | Yoneoka | G06F 3/1446 345/1.1 |

FOREIGN PATENT DOCUMENTS

| | | |
|---|---|---|
| CN | 1471348 A | 1/2004 |
| CN | 101971702 A | 2/2011 |

(Continued)

OTHER PUBLICATIONS

Chinese Office Action and Search Report dated Dec. 3, 2014 with a partial English translation thereof.
(Continued)

*Primary Examiner* — Jennifer Mehmood
*Assistant Examiner* — Krishna Neupane
(74) *Attorney, Agent, or Firm* — McGinn I.P. Law Group, PLLC.

(57) ABSTRACT

A parent device which is a liquid crystal monitor device serving as a reference for adjusting the backlight distributes, through communication, a backlight-setting value indicating luminance of a backlight to an child device which is a liquid crystal monitor device receiving adjustment of the backlight. A processing unit in the child device obtains a correction value from the backlight-setting value of the parent device received by a reception unit and a backlight-setting value input to an adjustment switch by the user. When the reception unit has received a new backlight-setting value of the parent device, the processing unit obtains the backlight-setting value of the child device from the new backlight-setting value and the correction value and instructs a backlight control circuit to light a backlight based on a lighting period corresponding to the obtained backlight-setting value.

14 Claims, 4 Drawing Sheets

(52) U.S. Cl.
CPC ............... *G09G 2320/062* (2013.01); *G09G 2320/0606* (2013.01); *G09G 2320/0626* (2013.01)

(56) References Cited

FOREIGN PATENT DOCUMENTS

| | | |
|---|---|---|
| JP | 2007-171327 A | 7/2007 |
| JP | 2008-120173 A | 5/2008 |
| JP | 2009-169196 A | 7/2009 |
| JP | 2010-117569 A | 5/2010 |
| JP | 2010-117596 A | 5/2010 |
| JP | 2011-95287 A | 5/2011 |

OTHER PUBLICATIONS

International Search Report in PCT/JP2011/063566 dated Jul. 12, 2011 (English Translation Thereof).

\* cited by examiner

LIQUID CRYSTAL MONITOR DEVICE, DISPLAY SYSTEM, AND BACKLIGHT CONTROL METHOD

TECHNICAL FIELD

The present invention relates to a liquid crystal monitor device, a display system and a backlight control method.

BACKGROUND ART

A display system is known in which a plurality of liquid crystal monitor devices are arranged and an image is displayed on the liquid crystal monitor devices at the same time.

Meanwhile, Patent Document 1 describes that a system control unit which controls an entire image display system using a plurality of projectors is provided in the image display system and this system control unit adjusts luminous intensity of a light source of each projector. The system control unit obtains luminance from a measurement value of a sensor included in each projector, and determines luminance which serves as a reference from the obtained luminance. The system control unit controls the luminous intensity of each projector to serve as the reference luminance.

Further, Patent Document 2 describes that each unit constituting an illumination luminance-setting system stores a luminance-setting table indicating a duty cycle of an LED (Light-Emitting Diode) of a backlight to correspond to luminance of each stage, and changes the luminance of all the units by transmitting a number of the luminance-setting table from the unit which a luminance change has been input to each of the other units.

Further, Patent Document 3 describes that each of displays constituting a multi-display device includes a backlight unit having a plurality of light sources, and each backlight unit is individually adjusted for the same luminance.

DOCUMENTS OF THE PRIOR ART

Patent Documents

Patent Document 1: Japanese Patent Laid-Open No. 2007-171327
Patent Document 2: Japanese Patent Laid-Open No. 2008-120173
Patent Document 3: Japanese Patent Laid-Open No. 2009-169196

DISCLOSURE OF INVENTION

Problems to be Solved by the Invention

Luminance of a backlight of a liquid crystal monitor can be changed based on a lighting period. However, the backlight has a lifespan with decreasing luminance. Further, a maximum luminance differs among individual backlights due to variations of manufacturing. Therefore, the luminances of the individual backlight differ even when lighting periods are the same. Therefore, even when the same lighting period is simultaneously set in the liquid crystal monitors constituting the display system through communication, the luminances of the backlights of the respective liquid crystal monitors are not the same. Thus, a display that it is difficult to watch is obtained when a plurality of liquid crystal monitors are used at the same time.

When the luminance is desired to be changed in the entire display system so that the luminances of the backlights of all the liquid crystal monitors become the same, a process of individually adjusting the luminance through visual observation or maintaining uniform luminance using a sensor is necessary. However, when there are a number of liquid crystal monitors, individual adjustment is a complicated task and also takes time. Further, the sensor is expensive and cost increases. Patent Documents 1 to 3 do not solve such problems.

The present invention has been made in consideration of such circumstances and provides a liquid crystal monitor device, a display system, and a backlight control method in which, in a display system using a plurality of liquid crystal monitor devices, luminances of backlights for all the liquid crystal monitor devices can be adjusted in conjunction with one another while maintaining correction of the backlights for the individual liquid crystal monitors without using a sensor.

Means for Solving the Problem

[1] The present invention is a liquid crystal monitor device used for a display system including a plurality of liquid crystal monitor devices which modulate light of a backlight using a liquid crystal panel and display an image, the liquid crystal monitor device including: a liquid crystal monitor; a backlight which outputs visible light to the liquid crystal monitor; an adjustment switch which receives an input of a backlight-setting value which is an adjustment value for the luminance of the backlight; a reception unit which receives the backlight-setting value of the parent device from the liquid crystal monitor device of the parent device; and a control unit which obtains a relationship between the backlight-setting value of the parent device and the backlight-setting value of the own device based on the backlight-setting value of the parent device received by the reception unit and the backlight-setting value input by the adjustment switch, calculates the backlight-setting value of the own device from the backlight-setting value of the parent device newly received by the reception unit based on the obtained relationship, and adjusts luminance of the backlight based on the calculated backlight-setting value of the own device.

Effects of the Invention

According to the present invention, in a display system using a plurality of liquid crystal monitor devices, luminances of all the liquid crystal monitor devices can be adjusted in conjunction with one another while maintaining correction of the backlights for the individual liquid crystal monitors without using a sensor.

EMBODIMENTS FOR CARRYING OUT THE INVENTION

Hereinafter, an embodiment of the present invention will be described with reference to the drawings.

Figure 1:
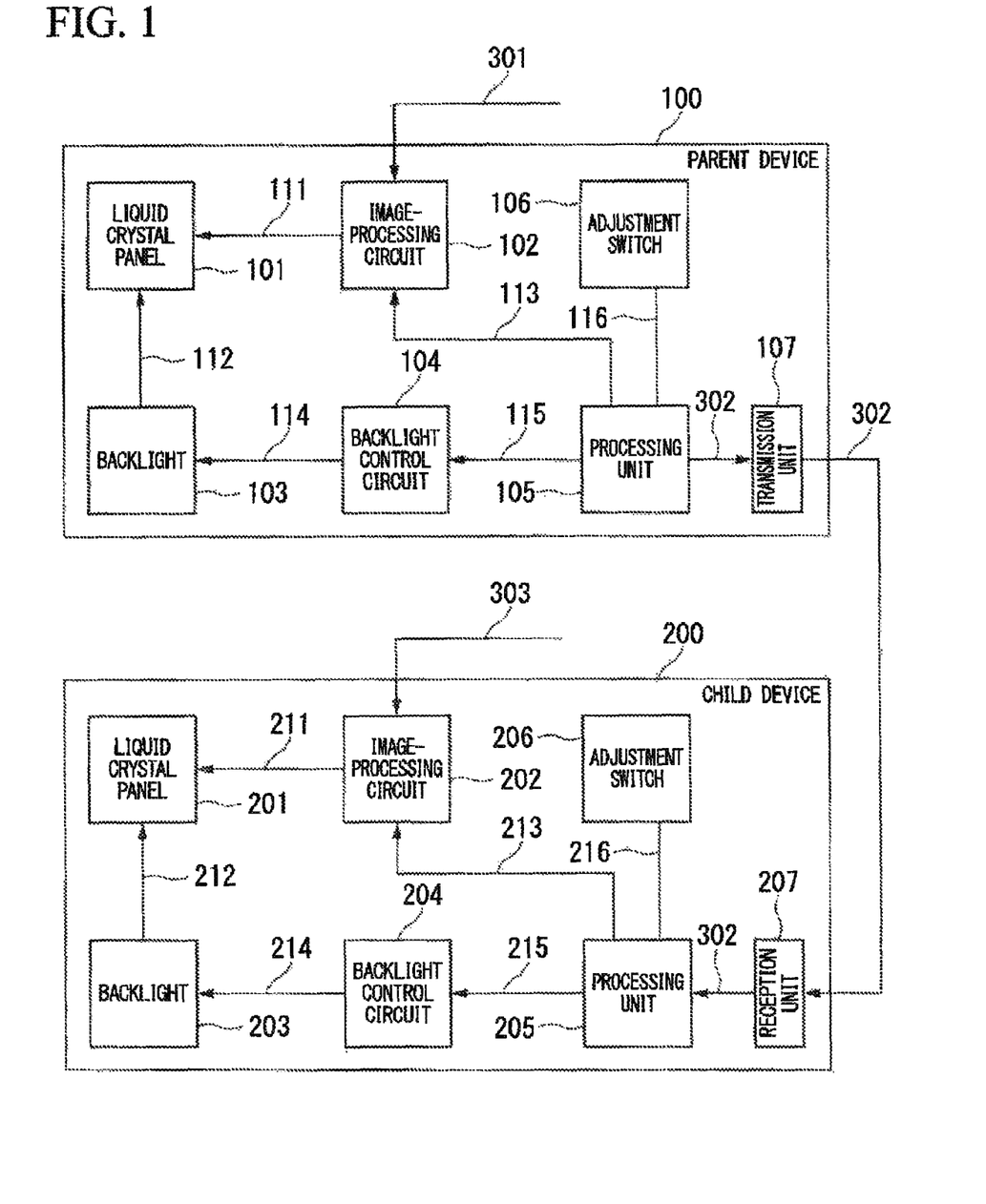
FIG. 1 is a block diagram illustrating a configuration of a display system according to an embodiment of the present invention.

FIG. 1 is a functional block diagram illustrating a configuration of a display system according to an embodiment of the present invention. The display system includes a plurality of liquid crystal monitor devices. The liquid crystal monitor device modulates light of a backlight using a liquid crystal panel to display an image. One of the plurality of liquid crystal monitor devices constituting the display system is a parent device 100, and the other liquid crystal monitor devices are child devices 200. While only one child device 200 is illustrated in FIG. 1, a plurality of the child devices may be included. The parent device 100 indicates a lighting period of the backlight of the liquid crystal panel to the child device 200 through communication. In the present embodiment, the parent device 100 notifies the child device 200 of a backlight-setting value which is a setting value (adjustment value) of luminance of the backlight in order to indicate the lighting period of the backlight.

The parent device 100 includes a liquid crystal panel 101, an image-processing circuit 102, a backlight 103, a backlight control circuit 104, a processing unit 105, an adjustment switch 106 and a transmission unit 107.

The adjustment switch 106 outputs an adjustment signal 116 based on an input of a user to the processing unit 105.

The processing unit 105 receives an input of the adjustment signal 116 from the adjustment switch 106. Further, the processing unit 105 outputs an image-processing circuit control signal 113 for controlling the image-processing circuit 102, a backlight control signal 115 for controlling the backlight control circuit 104 and a child device control signal 302 for controlling the child device 200. The processing unit 105 can transmit information to the child device 200 using the child device control signal 302. When a backlight-setting value of the parent device 100 is notified of by the adjustment signal 116, the processing unit 105 outputs the backlight control signal 115 based on the backlight-setting value to the backlight control circuit 104 and outputs the child device control signal 302 in which the backlight-setting value has been set, to the transmission unit 107.

The transmission unit 107 outputs the child device control signal 302 input from the processing unit 105 to the child device 200.

The image-processing circuit 102 performs a process of conversion to a signal optimal for the liquid crystal panel 101 based on an image signal 301 input from the outside and the image-processing circuit control signal 113 input from the processing unit 105, and outputs a liquid crystal panel image signal 111 provided through the conversion. The backlight control circuit 104 outputs a backlight-driving power 114 according to the backlight control signal 115 input from the processing unit 105. The backlight 103 outputs visible light 112 based on the backlight-driving power 114 supplied from the backlight control circuit 104. The liquid crystal panel 101 displays an image based on the liquid crystal panel image signal 111 input from the image-processing circuit 102 and the visible light 112 output by the backlight 103.

The child device 200 includes a liquid crystal panel 201, an image-processing circuit 202, a backlight 203, a backlight control circuit 204, a processing unit 205, an adjustment switch 206 and a reception unit 207.

The adjustment switch 206 outputs an adjustment signal 216 based on an input of the user to the processing unit 205. The reception unit 207 receives the child device control signal 302 from the parent device 100 and outputs the child device control signal 302 to the processing unit 205.

The processing unit 205 receives an input of the adjustment signal 216 from the adjustment switch 206 and receives an input of the child device control signal 302 from the reception unit 207. Further, the processing unit 205 outputs an image-processing circuit control signal 213 for controlling the image-processing circuit 202, and a backlight control signal 215 for controlling the backlight control circuit 204. When a backlight-setting value of the own device (the child device 200) is notified of by the adjustment signal 216 or the backlight-setting value of the parent device 100 is notified of by the child device control signal 302, the processing unit 205 calculates a new backlight-setting value of the own device and outputs the backlight control signal 215 based on the calculated backlight-setting value to the backlight control circuit 204.

The image-processing circuit 202 performs a process of conversion to a signal optimal for the liquid crystal panel 201 based on an image signal 303 input from the outside and the image-processing circuit control signal 213 input from the processing unit 205, and outputs a liquid crystal panel image signal 211 obtained through conversion. The backlight control circuit 204 outputs a backlight-driving power 214 according to the backlight control signal 215 input from the processing unit 205. The backlight 203 outputs a visible light 212 based on the backlight-driving power 214 supplied from the backlight control circuit 204. The liquid crystal panel 201 displays an image based on the liquid crystal panel image signal 211 input from the image-processing circuit 202 and the visible light 212 output by the backlight 203.

Further, the processing unit 105 and the processing unit 205 described above include a CPU (central processing unit) and various memories. Also, processes of the operation of the processing, unit 105 and the processing unit 205 are stored in a format of a program in a recording medium, and the process of the present embodiment is performed by the CPU reading and executing this program.

Figure 2:
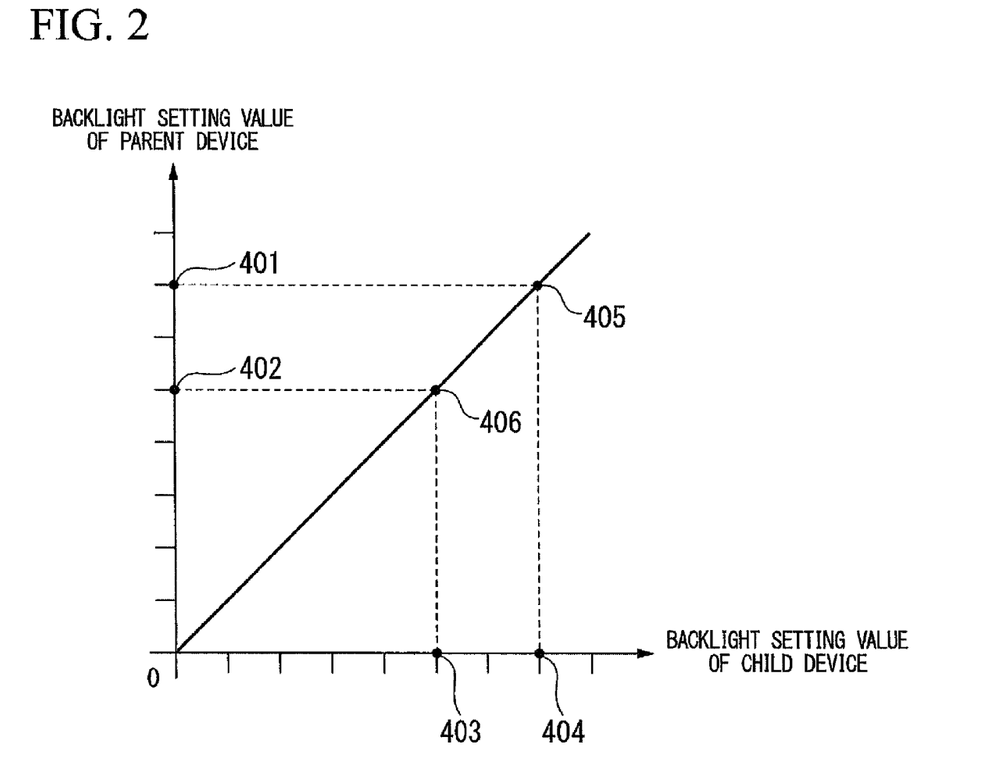
FIG. 2 is a diagram illustrating a relationship between a backlight-setting value of a parent device and a backlight-setting value of a child device according to the embodiment.

FIG. 2 is a diagram illustrating a relationship of the backlight-setting value of the parent device and the backlight-setting value of the child device. In FIG. 2, a coordinate plane in which the backlight-setting value of the parent device 100 is a vertical axis and the backlight-setting value of the child device 200 is a horizontal axis is illustrated in FIG. 2. FIG. 2 illustrates an example of a case in which the backlight-setting value has been changed in the parent device 100.

A backlight-setting value 401 and a backlight-setting value 402 are backlight-setting values of the parent device 100 (a setting value of luminance of the backlight 103). A backlight-setting value 403 and a backlight-setting value 404 are backlight-setting values of the child device 200 (setting values of luminance of the backlight 203).

The backlight-setting value 404 is a backlight-setting value input by the adjustment switch 206 of the child device 200. The backlight-setting value 404 is updated when the user adjusts the backlight-setting value of the child device 200. The backlight-setting value 403 is the backlight-setting value of the child device 200 after the luminance adjustment determined by the processing unit 205.

The backlight-setting value 401 is the backlight-setting value of the parent device 100 before the backlight-setting value 403 is changed, i.e., before the luminance adjustment of the child device 200. The backlight-setting value 402 is the backlight-setting value of the parent device 100 after the luminance adjustment. When the backlight-setting value of the parent device 100 is adjusted by the user and when the backlight-setting value of the child device 200 is adjusted by the user, the backlight-setting value 402 is updated. The backlight-setting value 402 is used to calculate the backlight-setting value 403 in the processing unit 205 of the child device 200.

Specifically, the processing unit 205 of the child device 200 obtains the backlight-setting value 403 from a coordinate 406 when a component of the vertical axis is the backlight-setting value 402 on a straight line which connects a coordinate 405 in which a component of the vertical axis is the backlight-setting value 401 of the parent device 100 and a component of the horizontal axis is a backlight-setting value 404 of the child device 200 with an origin 0. In other words, the processing unit 205 multiplies the backlight-setting value 402 of the parent device 100 by a correction value (a reciprocal number of a slope of the straight line) obtained (backlight-setting value 404 of child device 200)/(backlight-setting value 401 of parent device 100) to obtain the backlight-setting value 403 of the child device 200. Thus, the processing unit 205 obtains the backlight-setting value of the child device 200 through the calculation.

Next, operation of the backlight control process of the child device 200 will be described.

[Initial State]

In an initial state, the backlight-setting value from the parent device 100 has not yet been input to the child device 200. The processing unit 205 of the child device 200 determines that the backlight-setting value 401 of the parent device 100 and the backlight-setting value 404 of the child device are in one-to-one correspondence in the initial state. In other words, the processing unit 205 sets the initial value of a correction value to 1. Therefore, the processing unit 205 sets the initial value of the backlight-setting value of the child device 200 as a backlight-setting value 404 and sets the backlight-setting value 401 of the parent device 100 as the same value as the backlight-setting value 404. The initial value of the backlight-setting value of the child device 200 may be a value determined in advance or a value input to the adjustment switch 206 by the user and output to the processing unit 205 by the adjustment signal 216. Further, since the backlight-setting value is not input from the parent device 100, the processing unit 205 of the child device 200 sets the backlight-setting value 402 of the parent device 100 as the same value as the backlight-setting value 401.

Figure 3:
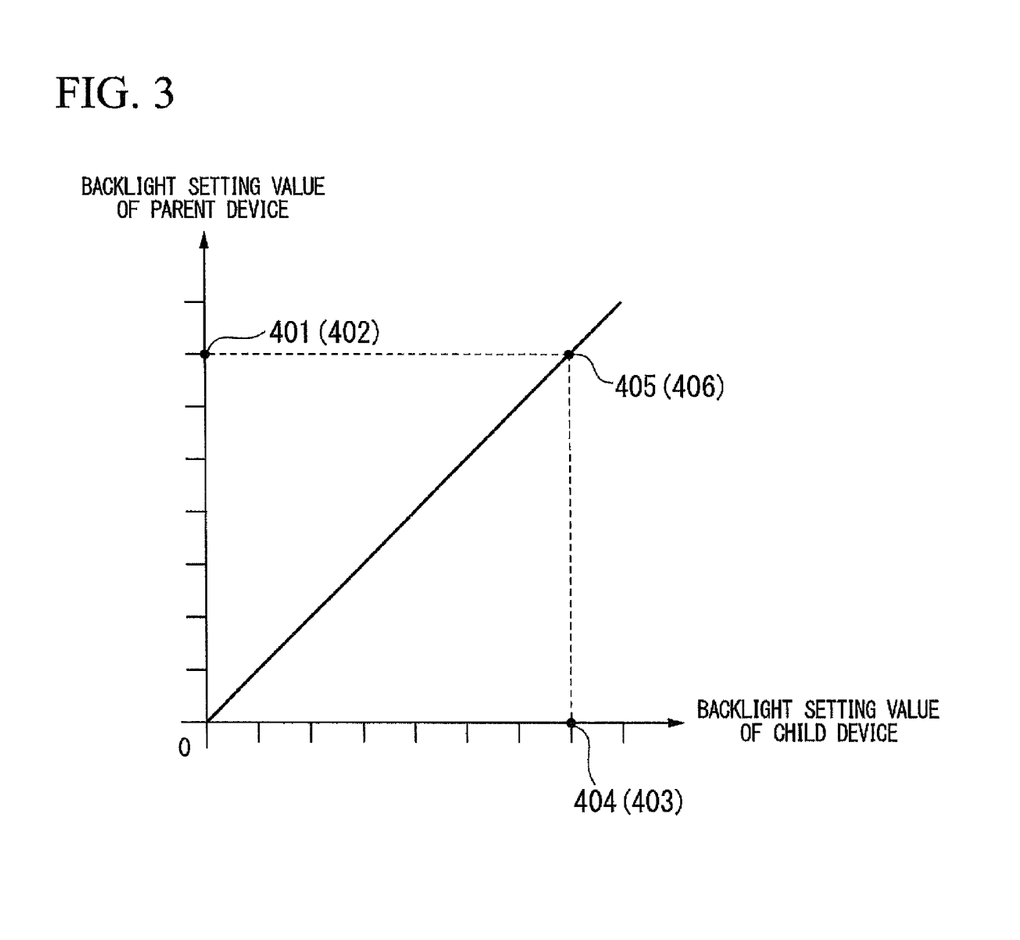
FIG. 3 is a diagram illustrating a relationship between a backlight-setting value of a parent device and a backlight-setting value of a child device according to the embodiment.

FIG. 3 is a diagram illustrating a relationship between the backlight-setting value of the parent device and the backlight-setting, value of the child device in the initial state. The backlight-setting value 403 of the child device 200 is obtained from a coordinate 406 when a component of a vertical axis is a backlight-setting value 402 on a straight line which connects a coordinate 405 in which a component of a vertical axis is a backlight-setting value 401 of the parent device 100 and a component of a horizontal axis is a backlight-setting value 404 of the child device 200 with an origin 0, as illustrated in FIG. 3. Since the backlight-setting value 401 and the backlight-setting value 402 match, the coordinate 406 and the coordinate 405 also match. Therefore, the processing unit 205 determines that the backlight-setting value 403 of the child device 200 is equal to the backlight-setting value 404 of the child device 200.

The processing unit 205 outputs the backlight control signal 215 according to the backlight-setting value 403 obtained as described above to the backlight control circuit 204. The backlight control signal 215 is, for example, a signal indicating an interval of the pulse corresponding to the backlight-setting value 403, and the processing unit 205 stores the correspondence between the backlight-setting value and the interval of the pulse in advance. The backlight control circuit 204 drives a power supply according to the interval of the pulse indicated by the backlight control signal 215 and controls a voltage or a current of the power supply which supplies the backlight-driving power 214 to the backlight 203. The backlight 203 lights in a lighting period according to the backlight-driving power 214. Accordingly, the luminance of the backlight 203 is adjusted to correspond to the backlight-setting value 403. The liquid crystal panel 201 displays an image using the liquid crystal panel image signal 211 input from the image-processing circuit 202 and visible light 212 of the backlight 203 whose luminance has been adjusted.

As will be described below, the adjustment of the backlight is then performed in the child device 200 or an adjustment value for the backlight is input from the parent device 100 to the child device 200.

[When Adjustment of Backlight is Performed in Child Device 200]

A user inputs an adjustment value for the luminance of the backlight 203 using the adjustment switch 206 of the child device 200. The adjustment switch 206 outputs an adjustment signal 216 in which the input adjustment value for the luminance is set, to the processing unit 205. The processing unit 205 sets the adjustment value for the luminance set in the adjustment signal 216 as the backlight-setting value 404 of the child device 200. Further, since the processing unit 205 receives an input of the adjustment signal 216 from the adjustment switch 206, the processing unit 205 determines that the backlight-setting value 401 of the parent device does not change.

Figure 4:
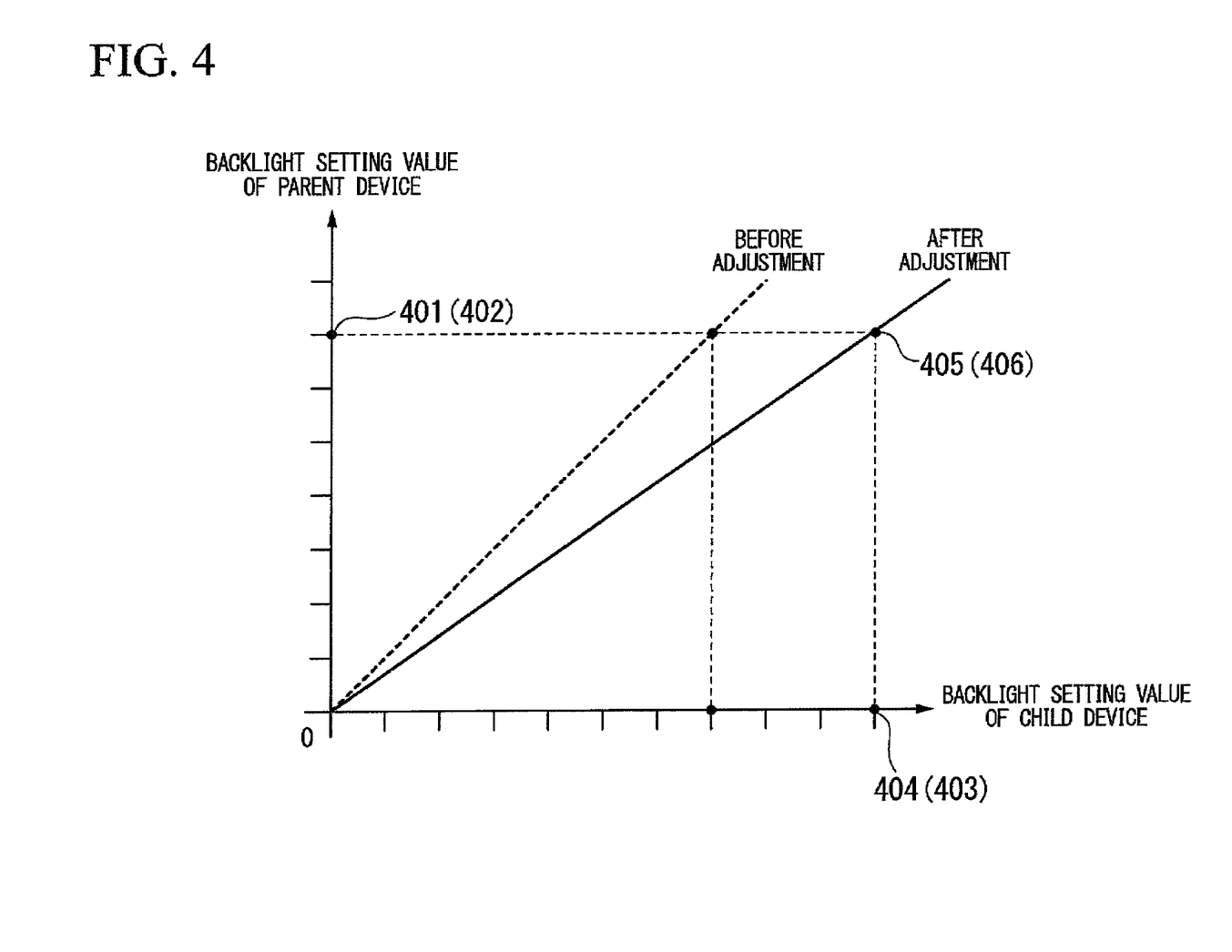
FIG. 4 is a diagram illustrating a relationship between a backlight-setting value of a parent device and a backlight-setting value of a child device according to the embodiment.

FIG. 4 is a diagram illustrating a relationship between the backlight-setting value of the parent device and the backlight-setting value of the child device when adjustment has been performed in the child device 200. As illustrated in FIG. 4, a slope of a straight line which connects a coordinate 405 in which a component of a vertical axis indicates the backlight-setting value 401 of the parent device 100 and a component of a horizontal axis is the backlight-setting value 404 of the child device 200 with an origin 0 changes before the adjustment. In other words, a correction value changes.

Further, since the backlight-setting value 404 of the child device 200 is adjusted, the processing unit 205 determines that the backlight-setting value of the parent device 100 does not change and sets the backlight-setting value 402 of the parent device 100 as the same value as the backlight-setting value 401 of the parent device 100. The processing unit 205 obtains the backlight-setting value 403 of the child device 200 from a coordinate 406 when the component of the vertical axis is the backlight-setting value 402 on the straight line which connects the coordinate 405 and the origin 0. Since the backlight-setting value 401 and the backlight-setting value 402 match, the coordinate 406 and the coordinate 405 also match. Therefore, the processing unit 205 determines that the backlight-setting value 403 of the child device 200 is a setting value which is equal to the backlight-setting value 404 of the child device 200, i.e., the setting value input by the adjustment switch 206.

The following process is the same as the process described in the initial state. In other words, the processing unit 205 outputs the backlight control signal 215 according to the obtained backlight-setting value 403 to the backlight control circuit 204. The backlight control circuit 204 controls a voltage or a current of the power supply which supplies the backlight-driving power 214 to the backlight 203 according to the backlight control signal 215. Accordingly, the luminance of the backlight 203 is adjusted, and the liquid crystal panel 201 displays an image using visible light 212 of the backlight 203 whose luminance has been adjusted.

The adjustment of the backlight is then performed in the child device 200 again or the adjustment value for the backlight is input from the parent device 100 to the child device 200, as will be described below.

[When Adjustment Value is Input from Parent Device 100 to Child Device 200]

A user inputs the adjustment value for the luminance of the backlight 103 using the adjustment switch 106 of the parent device 100. The adjustment switch 106 outputs an adjustment signal 116 in which the input adjustment value for the luminance is set to the processing unit 105. The processing unit 105 sets the adjustment value for the luminance set in the adjustment signal 116 as the backlight-setting value of the parent device 100. The processing unit 105 outputs the backlight control signal 115 according to the backlight-setting value of the parent device 100 to the backlight control circuit 104. The backlight control signal 115 is, for example, a signal which indicates an interval of a pulse corresponding to the backlight-setting value, and the processing unit 105 stores a correspondence between the backlight-setting value and the interval of the pulse in advance. The backlight control circuit 104 controls a voltage or a current of the power supply which supplies the backlight-driving power 114 to the backlight 103 according to the interval of the pulse indicated by the backlight control signal 115. The backlight 103 lights in a lighting period according to the backlight-driving power 214. Accordingly, the luminance of the backlight 203 is adjusted, and the liquid crystal panel 101 displays an image using visible light 212 of the backlight 103 whose luminance has been adjusted.

Further, the processing unit 105 outputs the child device control signal 302 in which the backlight-setting value of the parent device 100 has been set to the transmission unit 107, and the transmission unit 107 outputs the child device control signal 302 to the child device 200. The reception unit 207 of the child device 200 outputs the received child device control signal 302 to the processing unit 205. The processing unit 205 sets the backlight-setting value set in the child device control signal 302 as the backlight-setting value 402 of the parent device 100, and does not update the backlight-setting value 401 of the parent device and the backlight-setting value 404 of the child device.

Since the backlight-setting value 401 and the backlight-setting value 404 of the child device do not change, the slope of the straight line which connects the coordinate 405 with the origin 0 does not change, as illustrated in FIG. 3. For example, when the adjustment of the backlight is performed in the child device 200 as described above, the slope of the straight line when the adjustment of the backlight has been finally performed in the child device 200 is maintained. In other words, a current correction value does not change. The processing unit 205 obtains the backlight-setting value 403 of the child device 200 from the coordinate 406 when the component of the vertical axis is the backlight-setting value 402 on the straight line which connects the coordinate 405 with the origin 0.

The following process is the same as the process described in the initial state. In other words, the processing unit 205 outputs the backlight control signal 215 according to the obtained backlight-setting value 403 to the backlight control circuit 204. The backlight control circuit 204 controls a voltage or a current of the power supply which supplies the backlight-driving power 214 to the backlight 203 according to the backlight control signal 215. Accordingly, the luminance of the backlight 203 is adjusted, and the liquid crystal panel 201 displays an image using visible light 212 of the backlight 203 whose luminance has been adjusted.

The adjustment of the backlight is then performed in the child device 200, and the adjustment value for the backlight is input from the parent device 100 to the child device 200 again.

In the embodiment described above, the liquid crystal monitor device of the parent device which serves as a reference of the adjustment of the luminance distributes the backlight-setting value of the parent device to the liquid crystal monitor device of all child devices which receive the adjustment of the luminance through communication. The liquid crystal monitor device of the child device has a function of enabling the user to arbitrarily adjust the backlight-setting value of the child device, and obtains the relationship (correction value) between the backlight-setting value of the parent device and the backlight-setting value of the child device from the backlight-setting value of the liquid crystal monitor device of the parent device received from the parent device and the backlight-setting value input to the liquid crystal monitor device of the child device. When the backlight-setting value of the parent device changes, the liquid crystal monitor device of the child device calculates the backlight-setting value of the child device based on the obtained relationship, and performs control to light the backlight of the liquid crystal panel based on the lighting period corresponding to the calculated backlight-setting value. On the other hand, the parent device performs control to light the backlight of the liquid crystal panel based on the lighting period corresponding to the backlight-setting value of the parent device.

According to the embodiment described above, in the display system using a plurality of liquid crystal monitor devices, it is possible to adjust the luminances of all liquid crystal monitor devices in conjunction with one another while maintaining correction of the backlight for individual liquid crystal monitors. Further, the display system described above can be realized at a low cost since the display system does not use a sensor.

DESCRIPTION OF REFERENCE SYMBOLS

100 . . . parent device
101 . . . liquid crystal panel
102 . . . image-processing circuit
103 . . . backlight
104 . . . backlight control circuit
105 . . . processing unit
106 . . . adjustment switch
107 . . . transmission unit
111 . . . liquid crystal panel image signal
112 . . . visible light
113 . . . image-processing circuit control signal
114 . . . backlight-driving power
115 . . . backlight control signal
116 . . . adjustment signal
200 . . . child device
201 . . . liquid crystal panel
202 . . . image-processing circuit
203 . . . backlight 204 . . . backlight control circuit
205 . . . processing unit
206 . . . adjustment switch
207 . . . reception unit
211 . . . liquid crystal panel image signal
212 . . . visible light
213 . . . image-processing circuit control signal
214 . . . backlight-driving power
215 . . . backlight control signal
216 . . . adjustment signal
301 . . . video signal
302 . . . child device control signal
303 . . . video signal

The invention claimed is:

1. A liquid crystal monitor device used for a display system including a plurality of liquid crystal monitor devices which modulate light of a backlight using a liquid crystal panel and display an image, the liquid crystal monitor devices comprising a parent device, the liquid crystal monitor device comprising:
a liquid crystal monitor;
a backlight which outputs visible light to the liquid crystal monitor;
an adjustment switch configured to receive an input of a first backlight-setting value of an own device which is an adjustment value adjusted manually for luminance of the backlight;
a reception unit configured to receive a backlight-setting value of the parent device from the parent device, the backlight-setting value of the parent device comprising an adjustment value adjusted manually for luminance of a backlight of the parent device;
a control unit configured to adjust a luminance of the backlight of the own device; and
a storage configured to store a relationship between backlight-setting values of the own device and the parent device,
wherein the control unit is configured to:
adjust, when the adjustment switch receives the input of the first backlight-setting value of the own device, the luminance of the backlight on the basis of the first backlight-setting value of the own device and update the stored relationship to a first correction value on the basis of at least the first backlight-setting value of the own device;
calculate, when the reception unit further receives the backlight-setting value of the parent device, a second backlight-setting value of the own device corresponding to the received backlight-setting value of the parent device on the basis of the stored relationship and adjust the luminance of the backlight on the basis of the calculated second backlight-setting value of the own device; and
adjust, when the adjustment switch receives the input of a third backlight-setting value of the own device, the luminance of the backlight on the basis of the third backlight-setting value of the own device and update the stored relationship to a second correction value on the basis of at least the third backlight-setting value of the own device.

2. The liquid crystal monitor device according to claim 1, wherein the control unit performs control to light the backlight of the own device based on the lighting period according to the first or second backlight-setting value of the own device.

3. The liquid crystal monitor device according to claim 1, wherein, when the backlight-setting value of the parent device is manually adjusted and when the first or third backlight-setting value of the own device is manually adjusted, the first, second or third backlight-setting value of the own device is automatically updated, and
wherein the control unit obtains the relationship between the manually adjusted backlight-setting value of the parent device and the backlight-setting value of the own device based on the backlight-setting value of the parent device received by the reception unit and the updated first, second or third backlight-setting value of the own device.

4. The liquid crystal monitor device according to claim 1, wherein the control unit calculates the second backlight-setting value of the own device by multiplying the backlight-setting value of the parent device by the first correction value indicating the relationship.

5. The liquid crystal monitor device according to claim 1, wherein the liquid crystal monitor device of the own device includes a function of enabling a user to arbitrarily adjust the first backlight-setting value of the own device, and
wherein the control unit obtains the first correction value between the backlight-setting values of the parent device and the own device on the basis of the backlight-setting value of the parent device received from the parent device and the first backlight-setting value of the own device input to the own device by the user.

6. The liquid crystal monitor device according to claim 1, the luminances of all of the plurality of liquid crystal monitor devices is adjusted in conjunction with one another by the control unit, thereby to maintain correction of the backlight for individual liquid crystal monitors.

7. The liquid crystal monitor device according to claim 1, wherein the control unit is configured to calculate, when the reception unit further receives the backlight-setting value of the parent device, the second backlight-setting value of the own device and adjust the luminance of the backlight without updating the relationship stored in the storage.

8. The liquid crystal monitor device according to claim 1, wherein the storage is configured to:
store, as the relationship, an initial correction value indicating a ratio of an initial value of the backlight-setting value of the own device to an initial value of the backlight-setting value of the parent device before the adjustment switch receives the input of the first backlight-setting value of the own device; and
store, as the relationship, the first correction value indicating a ratio of the first backlight-setting value of the own device to the initial value of the backlight-setting value of the parent device when the adjustment switch receives the input of the first backlight-setting value of the own device.

9. The liquid crystal monitor device according to claim 8, wherein the control unit is configured to calculate the second backlight-setting value of the own device by multiplying the received backlight-setting value of the parent device by the first correction value.

10. A display system comprising a plurality of liquid crystal monitor devices which modulate light of a backlight using a liquid crystal panel and display an image, the liquid crystal monitor devices comprising a parent device and a child device, wherein:
the parent device comprises:
a first liquid crystal monitor;
a first backlight which outputs visible light to the first liquid crystal monitor;

a first adjustment switch configured to receive an input of a backlight-setting value of the parent device which is an adjustment value adjusted manually for luminance of the first backlight;

a first control unit configured to adjust the luminance of the first backlight based on the backlight-setting value of the parent device received by the first adjustment switch;

a transmission unit configured to transmit the backlight-setting value of the parent device received by the first adjustment switch to the child device, and the child device comprises:

a second liquid crystal monitor;

a second backlight which outputs visible light to the second liquid crystal monitor;

a second adjustment switch configured to receive an input of a first backlight-setting value of the child device which comprises an adjustment value adjusted manually for luminance of the second backlight;

a reception unit configured to receive the backlight-setting value of the parent device from the parent device;

a second control unit configured to adjust a luminance of the backlight of the child device; and a storage configured to store a relationship between backlight-setting values of the child device and the parent device, wherein the second control unit is configured to:

adjust, when the second adjustment switch receives the input of the first backlight-setting value of the child device, the luminance of the backlight of the child device on the basis of the first backlight-setting value of the child device and update the stored relationship to a first correction value on the basis of at least the first backlight-setting value of the child device;

calculate, when the reception unit further receives the backlight-setting value of the parent device, a second backlight-setting value of the child device corresponding to the received backlight-setting value of the parent device on the basis of the stored relationship and adjust the luminance of the backlight of the child device on the basis of the calculated second backlight-setting value of the child device; and adjust, when the adjustment switch receives the input of a third backlight-setting value of the child device, the luminance of the backlight on the basis of the third backlight-setting value of the child device and update the stored relationship to a second correction value on the basis of at last the third backlight-setting value of the child device.

11. The display system according to claim 10, wherein the first adjustment switch receives the input of the backlight-setting value of the parent device from a user.

12. A backlight control method for a display system including a plurality of liquid crystal monitor devices which modulate light of a backlight using a liquid crystal panel and display an image, the liquid crystal monitor devices including a child device and a parent device, the backlight control method comprising:

receiving an input of a first backlight-setting value of the child device which is an adjustment value adjusted manually for luminance of a backlight of the child device;

receiving a backlight-setting value of the parent device from the parent device, the backlight-setting value of the parent device comprising an adjustment value adjusted manually for luminance of a backlight of the parent device;

adjusting, when the input of the first backlight-setting value of the child device is received, the luminance of the backlight of the child device on the basis of the first backlight-setting value of the child device and updating a stored relationship between backlight-setting values of the child device and the parent device on the basis of at least the first backlight-setting value of the child device, to a first correction value;

calculating, when the backlight-setting value of the parent device is further received, a second backlight-setting value of the child device corresponding to the received backlight-setting value of the rent device on the basis of the stored relationship and adjusting the luminance of the backlight of the child device on the basis of the calculated second backlight-setting value of the child device; and adjusting, when the adjustment switch receives the input of a third backlight-setting value of the child device, the luminance of the backlight on the basis of the third backlight-setting value of the child device and updating the stored relationship to a second correction value on the basis of at least the third backlight-setting value of the child device.

13. A backlight control method for a display system including a plurality of liquid crystal monitor devices which modulate light of a backlight using a liquid crystal panel and display an image, the liquid crystal monitor devices including a parent device and a child device, the backlight control method comprising:

receiving, by the parent device, an input of a backlight-setting value of the parent device which is an adjustment value adjusted manually for luminance of a backlight of the parent device;

adjusting, by the parent device, the luminance of the backlight of the parent device based on the received backlight-setting value of the parent device;

transmitting, by the parent device, the received backlight-setting value of the parent device to the child device;

receiving, by the child device, an input of a first backlight-setting value of the child device which comprises an adjustment value adjusted manually for luminance of a backlight of the child device;

receiving, by the child device, the backlight-setting value of the parent device from the parent device;

adjusting, by the child device, when the input of the first backlight-setting value of the child device is received, the luminance of the backlight of the child device on the basis of the first backlight-setting value of the child device and updating a stored relationship between backlight-setting values of the child device and the parent device on the basis of at least the first backlight-setting value of the child device, to a first correction value;

calculating, by the child device, when the backlight-setting value of the parent device is further received, a second backlight-setting value of the child device corresponding to the received backlight-setting value of the parent device on the basis of the stored relationship and adjusting the luminance of the backlight of the child device on the basis of the calculated second backlight-setting value of the child device; and adjusting, when the adjustment switch receives the input of a third backlight-setting value of the child device, the luminance of the backlight on the basis of the third backlight-setting value of the child device and updating the stored relationship to a second correction value on the basis of at least the third backlight-setting value of the child device.

14. The backlight control method according to claim 13, wherein the receiving the input of the backlight-setting value of the parent device includes receiving the input of the backlight-setting value of the parent device from a user.

* * * * *